United States Patent [19]
Herbert

[11] Patent Number: 5,834,695
[45] Date of Patent: Nov. 10, 1998

[54] ELECTRICAL FITTING WITH TRANSPARENT MOUNTING PLATE

[75] Inventor: Caroline Serena Herbert, London, United Kingdom

[73] Assignee: Forbes & Lomax Limited, United Kingdom

[21] Appl. No.: 968,851

[22] Filed: Nov. 5, 1997

Related U.S. Application Data

[63] Continuation of Ser. No. 672,951, Jul. 19, 1996, abandoned.

[51] Int. Cl.⁶ .................................................. H02B 1/26
[52] U.S. Cl. ............................................ 174/66; 220/241
[58] Field of Search ................. 174/66, 67; 220/3.7, 220/3.8, 241, 242; 40/642.02, 725, 792; 200/317

[56] References Cited

U.S. PATENT DOCUMENTS

| | | | |
|---|---|---|---|
| 1,248,384 | 11/1917 | Newton et al. | 174/66 |
| 1,282,816 | 10/1918 | Guett | 174/66 |
| 3,953,933 | 5/1976 | Goldstein | 40/642.02 |
| 4,667,073 | 5/1987 | Osika | 174/66 |
| 4,800,239 | 1/1989 | Hill | 174/66 |
| 5,675,125 | 10/1997 | Hollinger | 174/66 |
| 5,723,817 | 3/1998 | Arenas et al. | 174/66 |

FOREIGN PATENT DOCUMENTS

| | | | |
|---|---|---|---|
| 968882 | 6/1975 | Canada | 174/66 |
| 1340066 | 12/1973 | United Kingdom | 174/66 |
| 2085229 | 4/1982 | United Kingdom | 174/66 |

*Primary Examiner*—Bot L. Ledynh
*Assistant Examiner*—Joseph Waks
*Attorney, Agent, or Firm*—Ira S. Dorman

[57] ABSTRACT

An electrical fitting adapted to blend with surrounding decorations includes a housing having a substantially planar surface, a transparent plate member, and fasteners for securing the transparent plate member to the housing such that the plate member is adjacent to the substantially planar surface. A matching element may be positioned between the transparent mounting plate and the housing, the matching element being substantially co-extensive with the mounting plate.

4 Claims, 2 Drawing Sheets

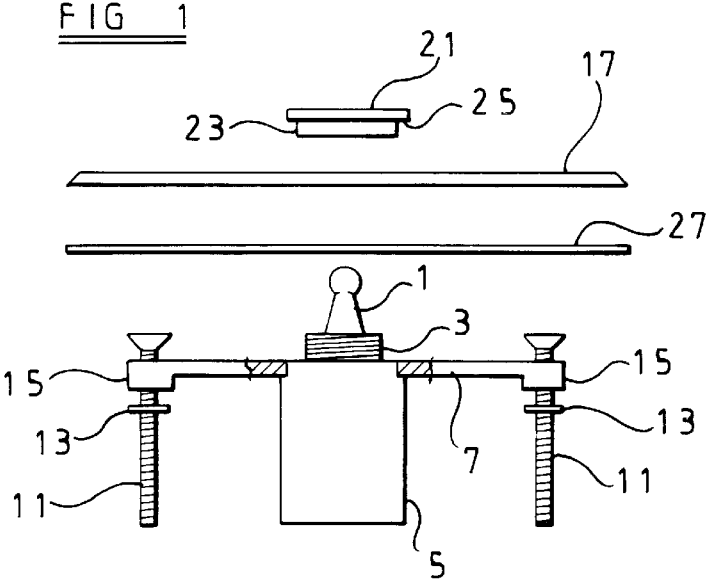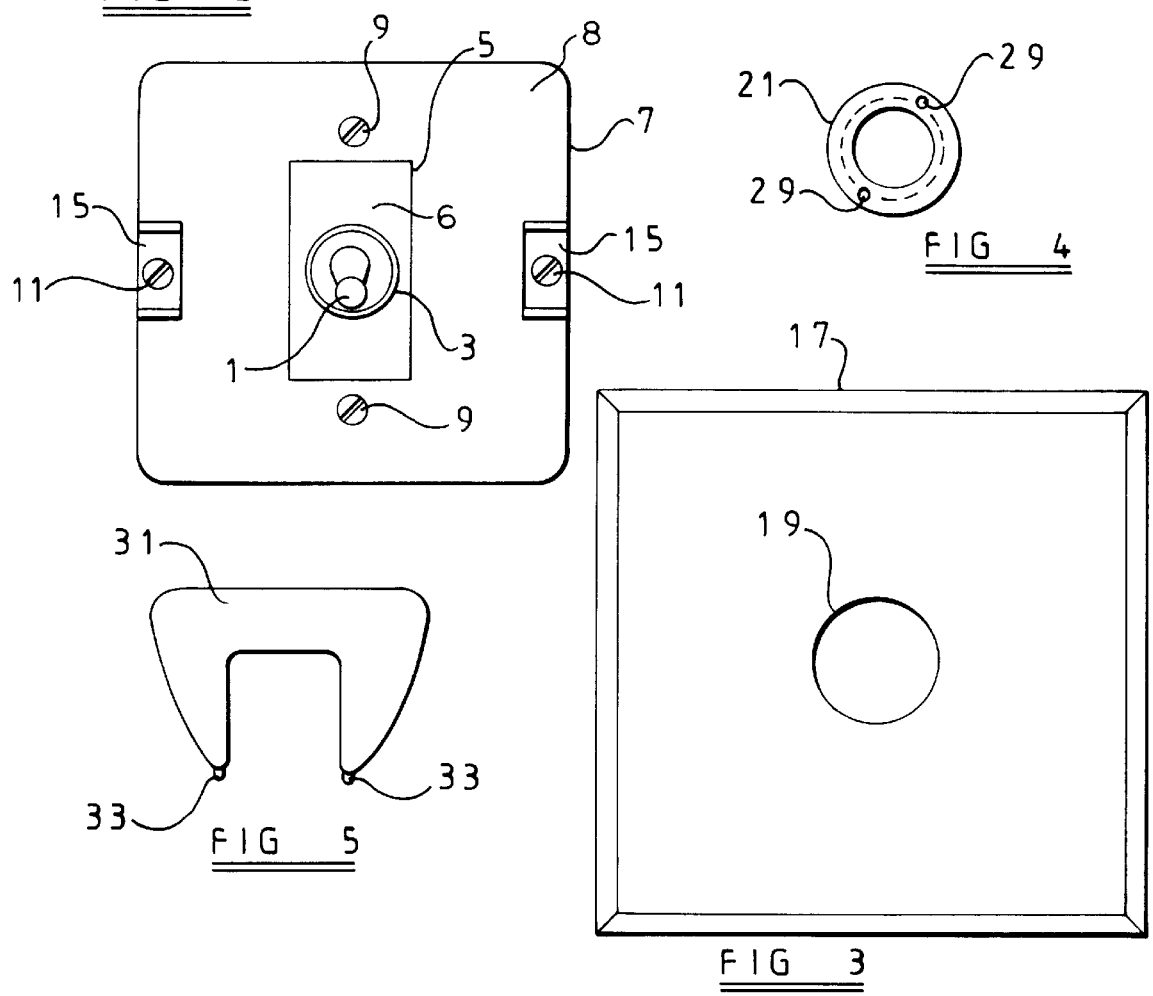

ELECTRICAL FITTING WITH TRANSPARENT MOUNTING PLATE

This application is a continuation of application Ser. No. 08/672,951, filed Jul. 19, 1996, now abandoned.

The present invention relates to an electrical fitting having a transparent mounting plate and to a method of installing such an electrical fitting.

BACKGROUND TO THE INVENTION

Electrical fittings, such as switches and sockets, are normally mounted in housings of metal or plastics material recessed into a wall or the like. The switch or socket is then mounted in the housing by means of screws which pass through an external mounting plate of the switch or socket and engage with the housing. The external mounting plate is generally made of a plastics material, for example white in colour, but can also be at least partly made of metal such as brass. However, there are occasions when a mounting plate of coloured plastics material or metal is undesirable, for example when it is desired that the mounting plate should blend, for example, with a particular wallpaper or colour of paint. There is therefore a demand for an electrical fitting which can readily blend with any desired wallpaper or colour of paint.

OBJECT OF THE INVENTION

It is therefore an object of the present invention to provide an electrical fitting, such as a switch or a socket, having a transparent mounting plate in order to permit the fitting to blend with any desired wallpaper, colour of paint or the like. A related object is to provide a method of installing such an electrical fitting in a manner which enables the fitting to blend with surrounding decorations.

SUMMARY OF THE INVENTION

According to one aspect of the present invention there is provided an electrical fitting comprising a housing having a substantially planar surface, a transparent plate member, and means for securing the transparent plate member to the housing such that the plate member is adjacent to the substantially planar surface.

The transparent plate member may be provided with an aperture therein and the housing may be provided with a protrusion, the protrusion being configured and dimensioned so as to pass at least partly through the aperture.

The protrusion may be substantially circular in cross-section and may be provided with an external thread thereon, there being provided in threaded engagement with the protrusion a fixing ring such that the transparent plate member is received between the housing and the fixing ring. The fixing ring may be stepped so as to provide an axial collar portion and a radial flange portion. In such an embodiment, the axial collar portion may have an axial length greater than the thickness of the mounting plate in order to eliminate any unnecessary stresses on the mounting plate.

Alternatively, the transparent mounting plate may be secured to the housing by means of a plurality of countersunk screws passing through apertures in the plate member and engaging with the housing.

A matching element may be positioned between the transparent mounting plate and the housing, the matching element being substantially co-extensive with the mounting plate. When the matching element is dimensioned in this way any minor irregularities between the matching element and the surrounding decorations are concealed by the edges of the mounting plate.

According to another aspect of the present invention there is provided a method of installing an electrical fitting comprising the step of securing a transparent plate member to a substantially planar surface of a housing such that the plate member is adjacent to the substantially planar surface.

The method may include the step of positioning a matching element between the housing and the transparent mounting plate, the matching element being substantially co-extensive with the mounting plate.

The mounting plate may be secured to the housing by threading a fixing ring onto an externally threaded protrusion of the housing, the transparent mounting plate being received between the housing and the fixing ring.

Alternatively, the mounting plate may be secured to the housing by means of a plurality of countersunk screws passing through apertures in the plate member and engaging with the housing.

For a better understanding of the present invention and to show more clearly how it may be carried into effect reference will now be made, by way of example, to the accompanying drawings in which:

BRIEF DESCRIPTION OF THE DRAWINGS

FIG. 1 is an exploded side elevational view of one embodiment of an electrical fitting according to the present invention in the form of a dolly switch;

FIG. 2 is a plan view of a switch unit forming part of the dolly switch shown in FIG. 1;

FIG. 3 is a plan view of a transparent cover plate forming part of the dolly switch shown in FIG. 1;

FIG. 4 is a plan view of a fixing ring forming part of the dolly switch shown in FIG. 1;

FIG. 5 is an elevational view of one embodiment of a fixing tool for mounting the fixing ring of FIG. 4 to the switch unit of FIG. 2;

DESCRIPTION OF PREFERRED EMBODIMENTS

Figure 6:
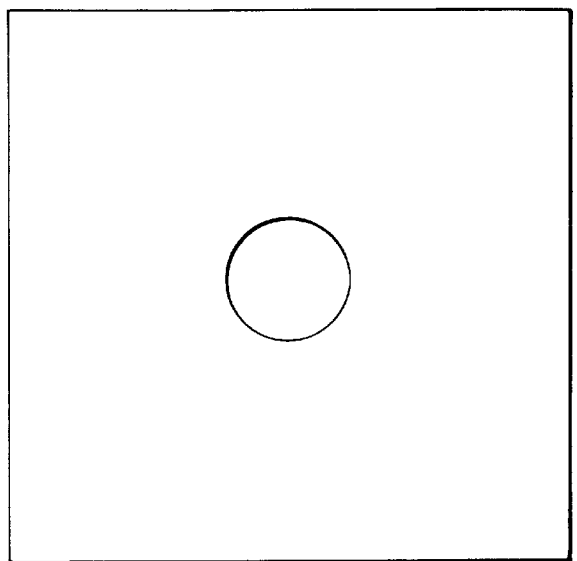
FIG. 6 is a plan view of one embodiment of a matching element in the form of a backing card for use with the dolly switch of FIGS. 1 to 5.

FIGS. 1 to 4 show an electrical fitting according to the present invention in the form of a dolly switch. A dolly switch 1 extends from an externally threaded boss 3 provided on a closed housing 5 for the switch. The switch 1 and boss 3 may be made, for example of brass or bronze or may be plated with chromium or nickel silver. The housing 5 is made of a plastics material. The housing 5 is secured to a so-called grid 7 by way of countersunk screws 9 passing through the grid and engaging in the housing. The housing is recessed around the periphery thereof in order that the external surface 6 at the top of the housing 5 should be flush with the external surface 8 at the top of the grid 7 with the peripheral region of the housing bearing against the opposing face of the grid.

The grid 7 is mounted in a mounting box (not shown) by means of screws 11 which pass through the grid and engage in the mounting box in a well-known manner. For convenience, the screws 11 are prevented from being accidentally removed from the grid 7 by means of a collar 13, for example of plastics material such as nylon, which engages around each screw on that side of the grid remote from the head of the screw. The screws 11 may be countersunk in the grid 7 in the same manner as the screws 9 in order that the external surface of the grid should be substantially planar, but in the illustrated embodiment the grid 7 is provided with a depression 15 in the region where each screw 11 passes through the grid.

The grid 7 is covered with a transparent mounting plate 17, made for example of clear cast acrylic plastics material. In the illustrated embodiment the mounting plate is square, but other configurations can be employed such as circular. The edges of the mounting plate are chamfered to eliminate sharp edges. An aperture 19 is formed through the mounting plate, the diameter of the aperture being somewhat greater than the diameter of the boss 3 for reasons that will be explained hereinafter.

The mounting plate 17 is secured to the remainder of the dolly switch by means of an internally threaded fixing ring 21 which is preferably made of a material to match the dolly switch 1 and the boss 3. As can be seen from FIG. 1, the fixing ring is stepped so as to provide an axial collar portion 23 and a radial flange portion 25. The axial collar portion has an axial length greater than the thickness of the mounting plate 17 such that, when the fixing ring is fully tightened on the boss 3 the mounting plate is not under compression. The effect of this is to permit a matching element 27 to be positioned between the grid 7 and the mounting plate 17 without there being any significant risk of damaging the mounting plate as a result of excessive compression. The matching element 27 is shown in plan view in FIG. 6 and will be described in more detail hereinafter. The radial flange portion 25 secures the mounting plate 17 to the remainder of the dolly switch. The outer face of the fixing ring 21 is provided with two diametrically opposed recesses 29 which can be engaged with a mounting and demounting tool as shown in FIG. 5.

The mounting and demounting tool shown in FIG. 5 comprises a generally U-shaped member 31 dimensioned to extend around the dolly switch 1. The tool is preferably made of plastics material, for example to minimise any accidental damage to the mounting plate 17. The legs of the member 31 are each provided at the free ends thereof with a projection 33 configured to be received by the recesses 29. Thus the fixing ring 21 can be secured on the boss 3 by clockwise rotation of the tool and can subsequently be removed from the boss 3 by anti-clockwise rotation of the tool.

In order that the mounting plate 17 should blend with any desired wallpaper, colour of paint or the like, a matching element or backing card 27 is positioned between the mounting plate 17 and the grid 7, the matching element or backing card having substantially the same dimensions as the mounting plate 17. Where the mounting plate 17 is required to blend with wallpaper a matching element 27 of the wallpaper is used, the wallpaper being cut such that any pattern on the wallpaper is continuous over the matching element and the remainder of the wallpaper. Where the mounting plate 17 is required to blend with paint or the like a backing card 27 is used, the backing card being painted or otherwise decorated to blend with the colour of the wall or the like.

In place of a dolly switch a rotary dimmer switch can be employed in conjunction with a similar, though not necessarily identical, fixing ring 21.

Clearly more than one switch can be provided in a single fitting. For example, in addition to one gang switches, two gang, three gang and four gang switches can be provided.

Figure 7:
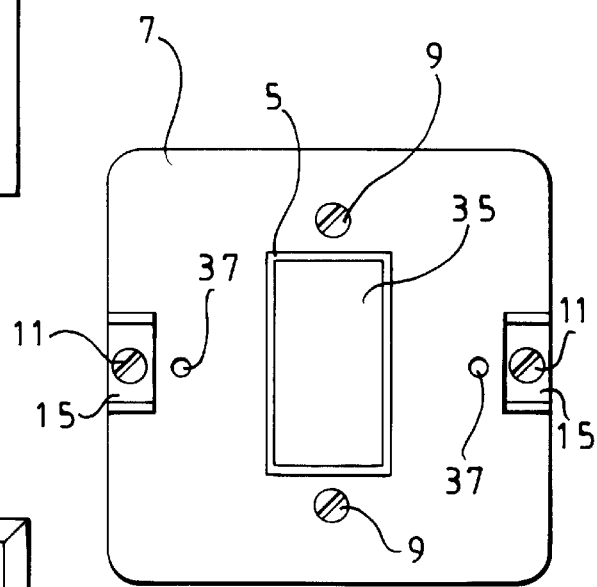
FIG. 7 is a plan view, similar to the view of FIG. 2, of a switch unit forming part of rocker switch.
Figure 8:
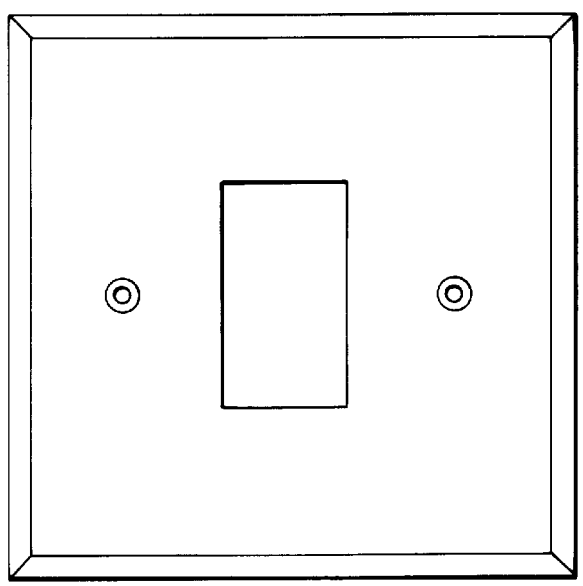
FIG. 8 is a plan view of a transparent cover plate for use with the switch unit of FIG. 7.

As shown in FIGS. 7 and 8, the present invention is also applicable to electrical fittings incorporating a rocker switch instead of a dolly switch. FIGS. 7 and 8 show an electrical fitting similar to that shown in FIGS. 1 to 4 except that a rectangular rocker switch 35 is provided in the housing 5 which is secured to the grid 7 by way of screws 9. In the illustrated embodiment the housing is provided with a raised lip around the rocker switch so that the portion of the rocker switch that is retracted (depending on whether the switch is on or off) is substantially flush with the lip. However, the raised lip is not essential. The mounting plate 17 is provided with a rectangular aperture 19 dimensioned to engage around the raised lip and with two countersunk apertures for receiving countersunk screws (not shown) which pass through the mounting plate and engage in threaded apertures 37 in the grid 7.

Use of the electrical fitting shown in FIGS. 7 and 8 is essentially the same as that shown in FIGS. 1 to 4 in that a matching element or backing card is positioned between the mounting plate 17 and grid 7, the matching element or backing card having substantially the same dimensions as the mounting plate 17. In the case of the electrical fitting of FIGS. 7 and 8 it is necessary for the matching element or backing card to be provided with apertures for receiving the countersunk screws (not shown) and the mounting plate and the matching element or backing card are secured to the grid 7 by means of the countersunk screws in place of a fixing ring.

In a similar manner to the rocker switch of the electrical fitting shown in FIGS. 7 and 8, electrical sockets can be installed using a transparent mounting plate if the socket is secured to a grid in the same manner as the rocker switch. The mounting plate can then be secured to the grid, together with a matching element or backing card, in the same manner as described in relation to FIGS. 7 and 8. It will generally be desirable for the plug receiving recesses of the socket to be surrounded by a raised lip and further more it may be desirable to provide a separate on-off switch mounted on the grid and positioned within the area of the mounting plate. Multiple sockets can be provided within a single grid and mounting plate if desired.

The invention can also be applied to electrical fitting for aerial and telephone cables, fused connections for appliances (with or without switches) and other similar electrical fittings.

I claim:

1. An electrical switch fitting comprising:

a switch housing having a first substantially planar support surface at a top of the housing, said first support surface having a first outer periphery;

a grid having a second substantially planar support surface at a top of the grid said second support surface extending around the first outer periphery of the first support surface and substantially coplanar therewith so as to form a substantially continuous planar support surface, said second support surface having a second outer periphery;

a transparent plate member provided with a first aperture therethrough and dimensioned to extend beyond the second outer periphery;

a decorative element positioned between the transparent plate member and the first and second support surfaces, the decorative element being substantially co-extensive with the transparent plate member and being provided with a second aperture therethrough substantially coincident with the first aperture through the transparent plate member;

a substantially circular protrusion extending from said first support surface and passing at least partly through the coincident first and second apertures of the plate member and the decorative element, respectively, the protrusion being provided with an external thread; and a fixing ring threadingly engaged on the protrusion and urging the transparent plate member and the decorative element towards the first and second support surfaces to bring the decorative element into engagement over substantially the entire area of said substantially continuous planar support surface.

2. An electrical switch fitting according to claim 1, wherein the fixing ring is stepped so as to provide an axial collar portion and a radial flange portion.

3. An electrical switch fitting according to claim 2, wherein the axial collar portion has an axial length greater than a thickness of the transparent plate member in at least an area underlying the radial flange portion of the fixing ring.

4. An electrical switch fitting according to claim 1, wherein the fixing ring is provided on an external surface thereof with diametrically opposed mounting and demounting recesses.

* * * * *